US011989211B2

United States Patent
Ike et al.

(10) Patent No.: US 11,989,211 B2
(45) Date of Patent: May 21, 2024

(54) NON-TRANSITORY COMPUTER-READABLE RECORDING MEDIUM, DATA CLUSTERING METHOD, AND INFORMATION PROCESSING APPARATUS

(71) Applicant: FUJITSU LIMITED, Kawasaki (JP)

(72) Inventors: Yuichi Ike, Kawasaki (JP); Yasuhiko Asao, Wako (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 17/828,344

(22) Filed: May 31, 2022

(65) Prior Publication Data

US 2022/0391416 A1    Dec. 8, 2022

(30) Foreign Application Priority Data

Jun. 4, 2021    (JP) .................... 2021-094357

(51) Int. Cl.
*G06F 16/00*    (2019.01)
*G06F 16/28*    (2019.01)

(52) U.S. Cl.
CPC .................... *G06F 16/285* (2019.01)

(58) Field of Classification Search
CPC .................................................... G06F 16/285
USPC ....................................................... 707/739
See application file for complete search history.

(56) References Cited

U.S. PATENT DOCUMENTS

2019/0012297 A1    1/2019    Kobayashi et al.

FOREIGN PATENT DOCUMENTS

JP    2019-016193 A    1/2019

OTHER PUBLICATIONS

Agustinus Kristiadi, Hessian and Curvatures in Machine Learning: A Differential-Geometric View, available at https://agustinus.kristia.de/techblog/2020/11/02/hessian-curvatures/. (Year: 2020).*
Yikai Wu, Dissecting Hessian: Understanding Common Structure of Hessian in Neural Networks, available at https://www.semanticscholar.org/paper/Dissecting-Hessian%3A-Understanding-Common-Structure-Wu-Zhu/8dc5e22b31d9aab6a49b98effb86af56444e4fe5. (Year: 2020).*
Agustinus Dristiadi, Hessian and Curvatures in Machine Learning: A Differential Geometric View, available at https://agustinus.kristia.de/techblog/2020/11/02/hessian-curvatures/ (Year: 2020).*
Yikai Wu, Dissecting Hessian: Understanding Common Structure of Hessian in Neutral Networks, available at https://openreview.net/forum?id=0rNLjXgchOC (Year: 2020).*

* cited by examiner

*Primary Examiner* — Alexandria Y Bromell
(74) *Attorney, Agent, or Firm* — Fujitsu Intellectual Property Center

(57) ABSTRACT

A non-transitory computer-readable recording medium stores therein a data clustering program that causes a computer to execute a process. The process includes calculating, for each of plural points included in a set of point group data, an eigenvector by using principal component analysis for a set of point group data that is present within a predetermined distance from a point; calculating a curvature of a multidimensional function having an extreme point that is a point positioned nearest to the eigenvector calculated; executing, on the basis of the curvature for each of the plural points of the set of point group data, clustering of the plural points; and outputting a result of execution of the clustering.

5 Claims, 9 Drawing Sheets

US 11,989,211 B2

NON-TRANSITORY COMPUTER-READABLE RECORDING MEDIUM, DATA CLUSTERING METHOD, AND INFORMATION PROCESSING APPARATUS

CROSS-REFERENCE TO RELATED APPLICATION

This application is based upon and claims the benefit of priority of the prior Japanese Patent Application No. 2021-094357, filed on Jun. 4, 2021, the entire contents of which are incorporated herein by reference.

FIELD

The embodiments discussed herein are related to a data clustering program, a data clustering method, and an information processing apparatus.

BACKGROUND

Data desired to be analyzed in various fields are often represented as several groups of real number values and regarded as point groups of an n-dimensional space. Feature values are extracted and classified from these sets of point group data in recent years. Specifically, a polygon to be associated with a set of point group data is selected, the polygon is fitted to the set of point group data by use of, for example, the least-squares method, and a set of singular points are extracted by use of minimum distances from the polygon fitted.

Patent Literature 1: Japanese Laid-open Patent Publication No. 2019-016193

SUMMARY

According to an aspect of the embodiments, a non-transitory computer-readable recording medium stores therein a data clustering program that causes a computer to execute a process. The process includes calculating, for each of plural points included in a set of point group data, an eigenvector by using principal component analysis for a set of point group data that is present within a predetermined distance from a point; calculating a curvature of a multidimensional function having an extreme point that is a point positioned nearest to the eigenvector calculated; executing, on the basis of the curvature for each of the plural points of the set of point group data, clustering of the plural points; and outputting a result of execution of the clustering.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, extracting features of respective points of a set of point group data by means of the above described technique is difficult. For example, the overall shape of a set of point group data needs to be known and represented by a polygon beforehand in the error fitting technique. Furthermore, fitting is repeated when representation by an appropriate polygon fails and time is thus needed.

Preferred embodiments will be explained with reference to accompanying drawings. The invention is not limited by these embodiments. Furthermore, these embodiments may be combined as appropriate so long as no contradictions arise therefrom.

[a] First Embodiment

Overall Configuration

Figure 1:
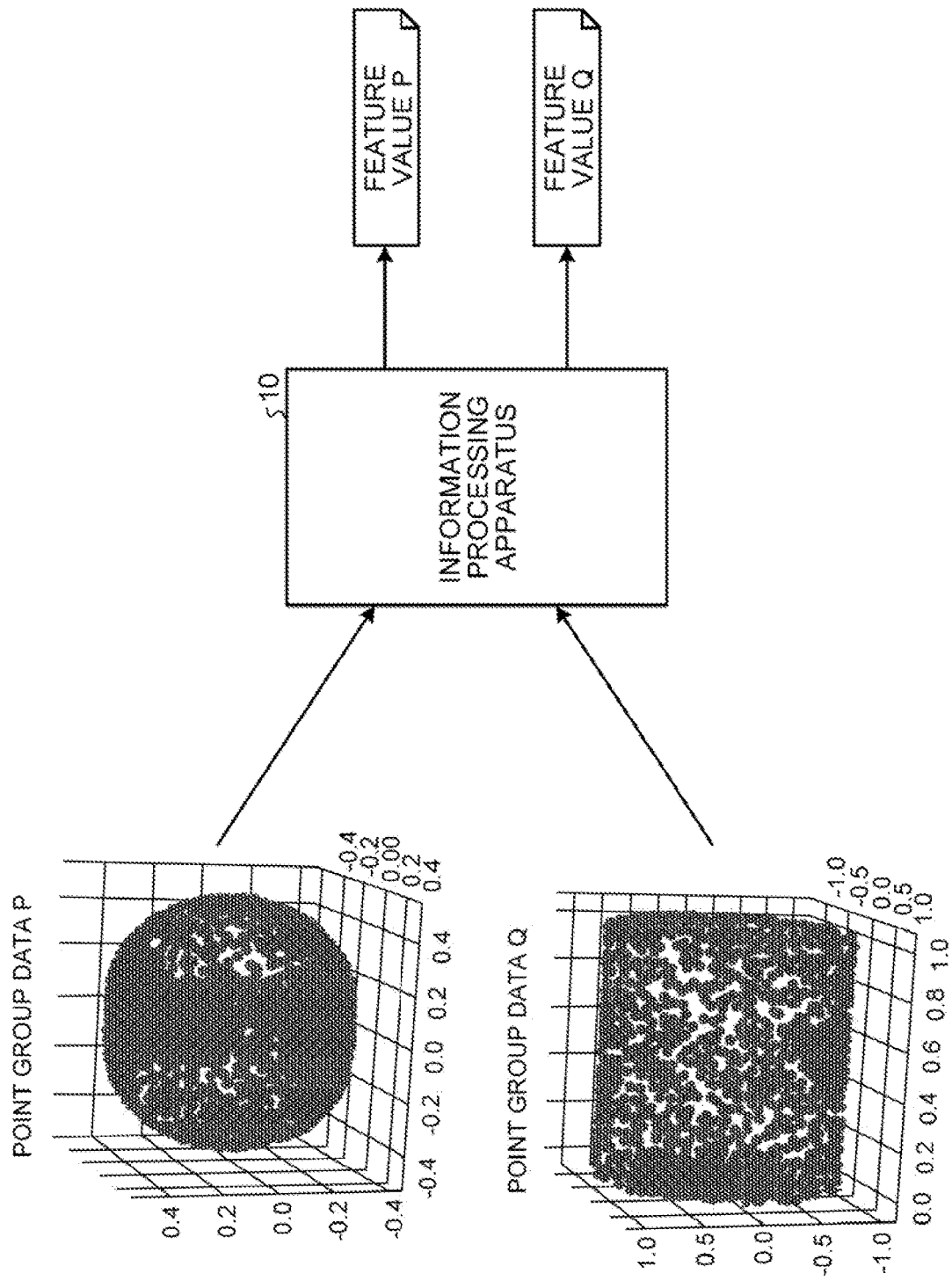
FIG. 1 is a diagram for explanation of an information processing apparatus according to a first embodiment.

FIG. 1 is a diagram for explanation of an information processing apparatus 10 according to a first embodiment. This information processing apparatus 10 is an example of a computer apparatus that generates and outputs feature values, such as a feature value P and a feature value Q, for various sets of point group data, such as a set of point group data P and a set of point group data Q. These feature values accurately represent features of these sets of point group data.

The following description is on topological data analysis (hereinafter, TDA) that is used in generation of feature values of sets of point group data. In TDA, executing persistent homology transform of a set of point group data generates a persistence diagram characterizing transition of m-dimensional holes and generates a feature value of the set of point group data.

"Homology" is a method of representing a target feature by the number of m-dimensional holes, where $m \geq 0$. "Holes" referred to herein are elements of a homology group. A zero-dimensional hole is a connected component, a one-dimensional hole is a hole or tunnel, and a two-dimensional hole is a cavity. The number of holes in each dimensionality is called a Betti number. "Persistent homology" is a method of characterizing transition of m-dimensional holes in a target that is a set of points or a point cloud herein. Persistent homology enables determination of features related to arrangement of points. In this method, each point in the target is gradually expanded spherically. During the course of this expansion, a time at which each hole is generated and a time at which the hole disappears are determined. The time at which each hole is generated is represented by the radius of the sphere at the time the hole is generated and the time at which the hole disappears is represented by the radius of the sphere at the time the hole disappears.

Figure 2:
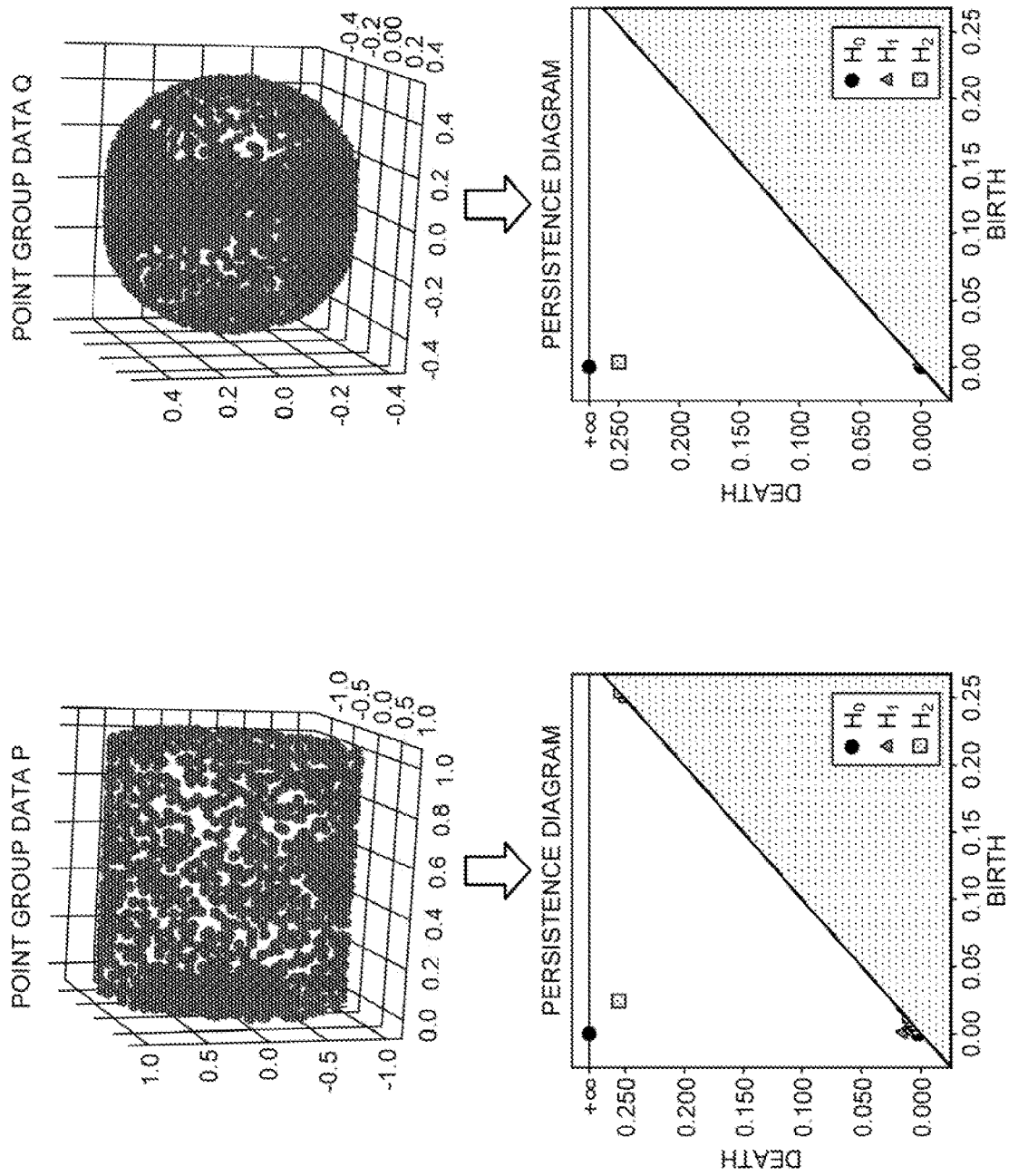
FIG. 2 is diagram for explanation of a problem in TDA.

Results of generating respective feature values of the set of point group data P having a cylindrical shape and the set of point group data Q having a spherical shape by using TDA will be described next. FIG. 2 is diagram for explanation of a problem in TDA.

Specifically, FIG. 2 illustrates a persistence diagram representing, by TDA of the set of point group data P, times $H_0$ of generation or birth and of disappearance or death of zero-dimensional holes, times $H_1$ of birth and death of one-dimensional holes, and times $H_2$ of birth and death of two-dimensional holes. Similarly, FIG. 2 illustrates a persistence diagram representing, by TDA of the set of point group data Q, times $H_0$ of birth and death of zero-dimensional holes, times $H_1$ of birth and death of one-dimensional holes, and times $H_2$ of birth and death of two-dimensional holes.

As can be understood by comparison between these persistence diagrams in FIG. 2, in feature value generation (analysis) by TDA, similar feature values are generated from sets of point group data having topologically the same shape and distinguishing between these sets of point group data is difficult. That is, when sets of point group data with unknown shapes are analyzed, the same feature value may be generated for differently shaped sets of data. Therefore, when generating labelled training data by using sets of point group data, for example, the same label will be assigned to sets of point group data to which different labels are supposed to be assigned and training precision will thereby be degraded.

Furthermore, selecting polygons by using feature values obtained by TDA and fitting these polygons to sets of point group data may be considered, but if the feature values serving as materials for this selection are not accurate, appropriate polygons are unable to be selected. In the case of FIG. 2, the same polygon will be selected for both the set of point group data P and the set of point group data Q and accurate fitting will thus be impossible.

Therefore, for each of plural points included in a set of point group data, the information processing apparatus 10 according to the first embodiment calculates an eigenvector by using principal component analysis for a set of point group data that is present within a predetermined distance from that point. The information processing apparatus 10 calculates a curvature of a multidimensional function having an extreme point or a stationary point that is a point positioned nearest to the eigenvector calculated. On the basis of the curvature for each of the plural points of the set of point group data, the information processing apparatus 10 generates a feature value of the set of point group data.

That is, the information processing apparatus 10 calculates curvature values that are values representing the states of curving and determined locally from the set of point group data, and regards a frequency distribution of those values as a feature value. As a result, the information processing apparatus 10 enables distinction between sets of point group data that have topologically the same shape but are differently shaped curvature-wise, and enables extraction of accurate feature values of the sets of point group data.

Functional Configuration

Figure 3:
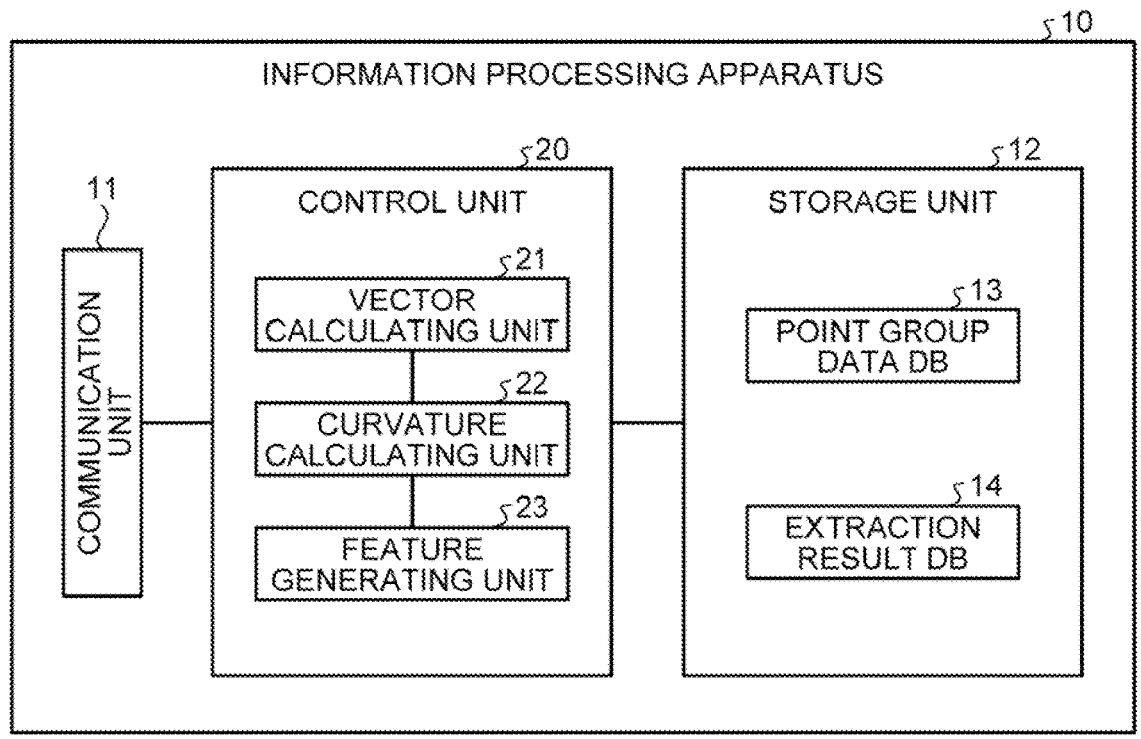
FIG. 3 is a functional block diagram illustrating a functional configuration of an information processing apparatus according to the first embodiment.

FIG. 3 is a functional block diagram illustrating a functional configuration of the information processing apparatus 10 according to the first embodiment. As illustrated in FIG. 3, the information processing apparatus 10 has a communication unit 11, a storage unit 12, and a control unit 20.

The communication unit 11 is a processing unit that controls communication with another device and is implemented by, for example, a communication interface. For example, the communication unit 11 receives a set of point group data from a device, such as an administrator terminal or a 3D sensor, and transmits a result of extraction or a result of analysis, for example, to the administrator terminal.

The storage unit 12 is an example of a storage device that stores therein various data and a program executed by the control unit 20, for example. For example, the storage unit 12 stores therein a point group data DB 13 and an extraction result DB 14.

The point group data DB 13 is a database that stores therein sets of point group data on various objects scanned in a three dimensional space by use of, for example, a 3D sensor or a range measuring sensor. In the above described example, the point group data DB 13 stores therein the set of point group data P and the set of point group data Q. For explanation, the set of point group data P has a cylindrical shape and the set of point group data Q has a spherical shape, but until characterization of the set of point group data P and the set of point group data Q is done by the control unit 20, these shapes are unknown.

The extraction result DB 14 is a database storing therein a result of extraction performed by the control unit 20. For example, the extraction result DB 14 stores therein a feature value of the set of point group data P and a feature value of the set of point group data Q.

The control unit 20 is a processing unit that controls the whole information processing apparatus 10 and is implemented by, for example, a processor. This control unit 20 has a vector calculating unit 21, a curvature calculating unit 22, and a feature generating unit 23. The vector calculating unit 21, the curvature calculating unit 22, and the feature generating unit 23 may each be implemented as a process executed by an electronic circuit included in the processor or by the processor.

The vector calculating unit 21 is a processing unit that calculates, for each of plural points included in a set of point group data, an eigenvector by using principal component analysis for a set of point group data that is present within a predetermined distance from that point. For example, the vector calculating unit 21 calculates eigenvectors for respective points of the set of point group data P and respective points of the set of point group data Q.

Figure 4:
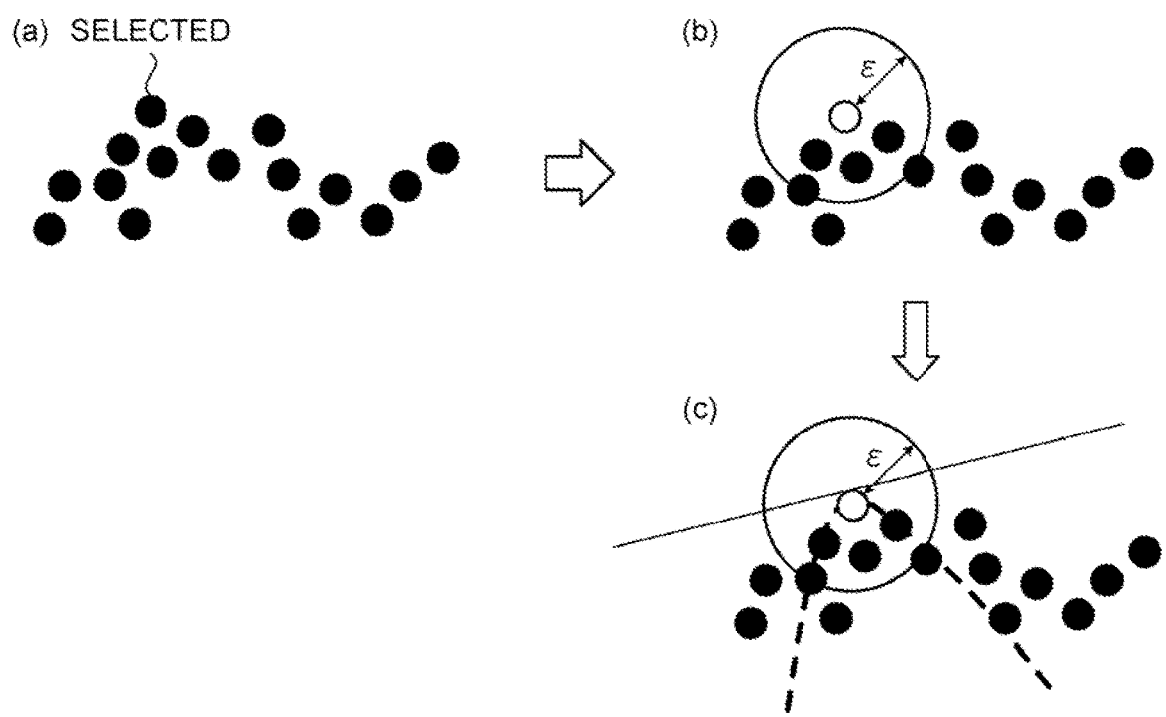
FIG. 4 is a diagram for explanation of a method of calculating an eigenvector for each point of a set of point group data.

FIG. 4 is a diagram for explanation of a method of calculating an eigenvector for each point of a set of point group data. Firstly, the vector calculating unit 21 receives, for example, input by a user, such as an administrator, and sets a threshold ε and a threshold δ that are values larger than 0, for a set of point group data X that is a subset in a d-dimensional real number space $R^d$.

Subsequently, as illustrated at (a) in FIG. 4, the vector calculating unit 21 selects a point x that is an element of the set of point group data X. As illustrated at (b) in FIG. 4, the vector calculating unit 21 then defines, for the point x, a point group B that is within a sphere having a radius e, as expressed by Equation 1. Subsequently, as illustrated at (c) in in FIG. 4, the vector calculating unit 21 applies principal component analysis (PCA) to the point group B and obtains a space spanned by an eigenvector having an eigenvalue equal to or larger than the threshold δ. The vector calculating unit 21 executes the above processing for each point in the set of point group data.

$$B := X \cap B(x; \varepsilon) \quad (1)$$

The curvature calculating unit 22 is a processing unit that calculates a curvature of a multidimensional function having an extreme point that is a point positioned nearest to an eigenvector calculated. Specifically, the curvature calculating unit 22 calculates a curvature for each point in the set of point group data P and each point in the set of point group data Q and outputs the curvatures to the feature generating unit 23.

For example, the curvature calculating unit 22 applies, by the least squares method, a quadratic function having the point x at a vertex thereof to the point group B, the point x being the above mentioned space and having a value in the direction of an eigenvector corresponding to an eigenvalue of eigenvalues calculated by the vector calculating unit 21, the eigenvalue being equal to or larger than a predetermined value.

That is, the curvature calculating unit 22 sets coordinates $x_1, x_2, \ldots, x_k$ in a k-dimensional space having an eigenvalue equal to or larger than $\delta$ and sets an axis $x_{k+1}$ in the direction of the k+1-th eigenvector. Subsequently, the curvature calculating unit 22 generates a quadratic function expressed by Equation 2 applied by the least squares method, and calculates a Hessian expressed by Equation 3 for that quadratic function. The curvature calculating unit 22 then determines that Hessian as a curvature of each point.

$$x_{k+1} = f(x_1, \ldots, x_k) = \frac{1}{2}\sum_{i,j} a_{ij}x_i x_j (a_{ij} = a_{ji}) \quad (2)$$

$$H_f = \det\begin{bmatrix} \partial^2 f/\partial x_1 \partial x_1 & \cdots & \partial^2 f/\partial x_1 \partial x_k \\ \vdots & \ddots & \vdots \\ \partial^2 f/\partial x_k \partial x_1 & \cdots & \partial^2 f/\partial x_k \partial x_k \end{bmatrix} = \det\begin{bmatrix} a_{11} & \cdots & a_{1k} \\ \vdots & \ddots & \vdots \\ a_{k1} & \cdots & a_{kk} \end{bmatrix} \quad (3)$$

The feature generating unit 23 is a processing unit that generates, on the basis of a curvature for each of plural points of a set of point group data, a feature value of the set of point group data. Specifically, for each of the set of point group data P and the set of point group data Q, the feature generating unit 23 calculates a feature of each set of point group data represented by plural points, the feature being a distribution (a frequency distribution) of curvatures for the plural points in the set of point group data, and stores the features calculated into the extraction result DB 14.

Figure 5:
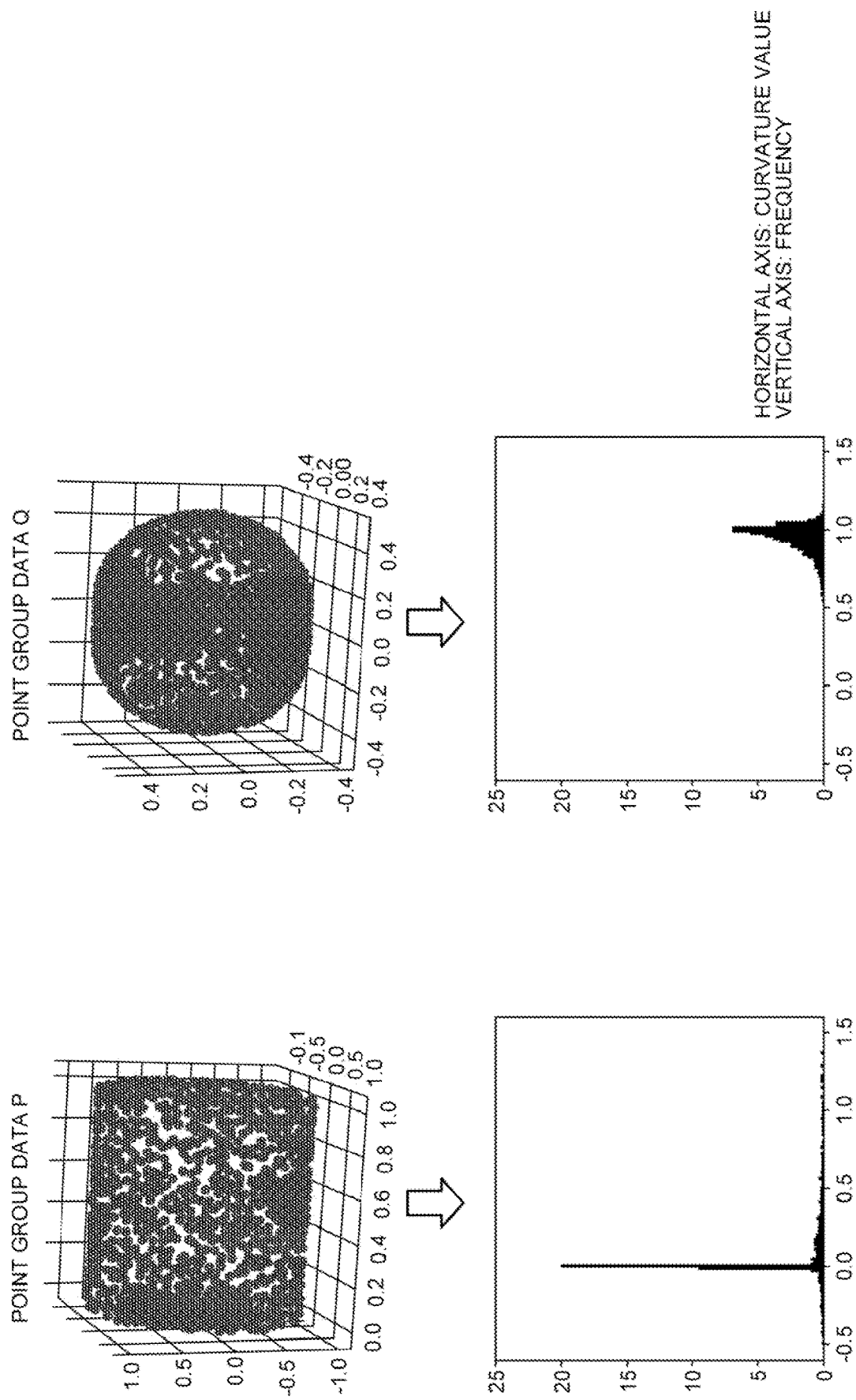
FIG. 5 is a diagram for explanation of a result of extraction of a feature value of each set of point group data.

FIG. 5 is a diagram for explanation of a result of extraction of feature values of sets of point group data. As illustrated in FIG. 5, the feature generating unit 23 generates a frequency distribution having curvature values along the horizontal axis and frequencies along the vertical axis, the frequencies each being the number of points having that curvature. That is, the feature generating unit 23 counts the numbers of curvatures that the respective points of the set of point group data have. As a result, the set of point group data P has a concentration of points having a curvature of 0.0 and the feature generating unit 23 is thus able to characterize the set of point group data P as having a shape with comparatively fewer curved surfaces or curved lines. On the contrary, the set of point group data Q has a concentration of points having a curvature around 1.0 and the feature generating unit 23 is thus able to characterize the set of point group data Q as having a shape with many curved surfaces or curved lines.

Flow of Process

Figure 6:
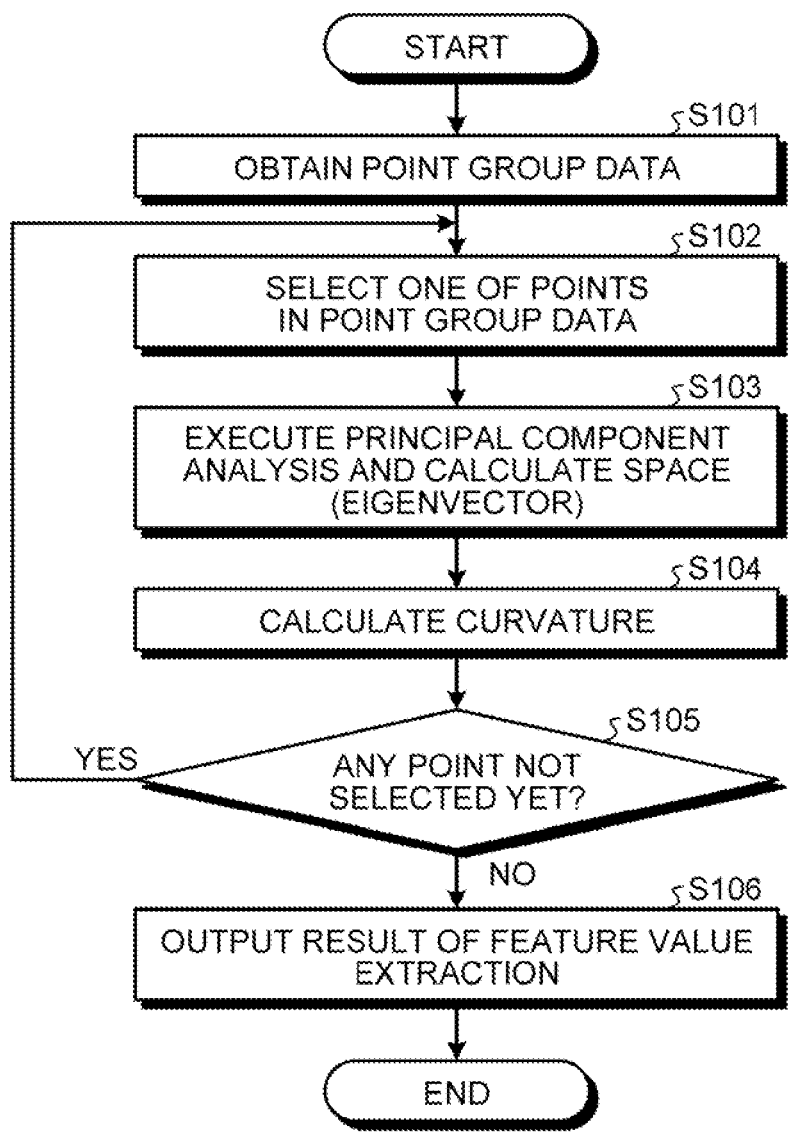
FIG. 6 is a flowchart illustrating a flow of a process according to the first embodiment.

FIG. 6 is a flowchart illustrating a flow of a process according to the first embodiment. As illustrated in FIG. 6, the vector calculating unit 21 of the information processing apparatus 10 obtains a set of point group data (S101) and selects one of points (data) in the set of point group data (S102).

Subsequently, the vector calculating unit 21 calculates a space (an eigenvector) by executing principal component analysis (S103). The curvature calculating unit 22 then calculates a curvature that is a curvature value determined locally from the set of point group data (S104).

In a case where there is any point (data) that has not been selected yet in the set of point group data (S105: Yes), the process is repeated from Step S102 for that point that has not been selected yet. On the contrary, in a case where there is no point (data) that has not been selected yet in the set of point group data (S105: No), the feature generating unit 23 generates and outputs a result of extraction of a feature value of the set of point group data by using the calculated curvature of each point (S106).

Effects

As described above, the information processing apparatus 10 is able to calculate a curvature for each point of a set of point group data and to generate a feature value using the curvatures. As a result, the information processing apparatus 10 is able to distinguish between point groups that are shaped topologically the same but shaped differently from each other curvature-wise, by looking at curvature-wise local differences. Furthermore, the information processing apparatus 10 generates a frequency distribution of curvatures of the respective points and thus enables visualization of feature values and improvement of interpretability for users.

Furthermore, when generating training data for a machine learning model from sets of point group data, the information processing apparatus 10 is able to accurately distinguish between the sets of point group data and is thus able to assign accurate labels or teacher information to the respective sets of point group data. Therefore, the information processing apparatus 10 enables improvement of training precision for machine learning models.

[b] Second Embodiment

By using feature values described with respect to the first embodiment, the information processing apparatus 10 is able to execute clustering of sets of point group data. Therefore, an example in which clustering of sets of point group data is executed and accurate fitting between the sets of point group data and polygons is executed will be described as a second embodiment.

Functional Configuration

Figure 7:
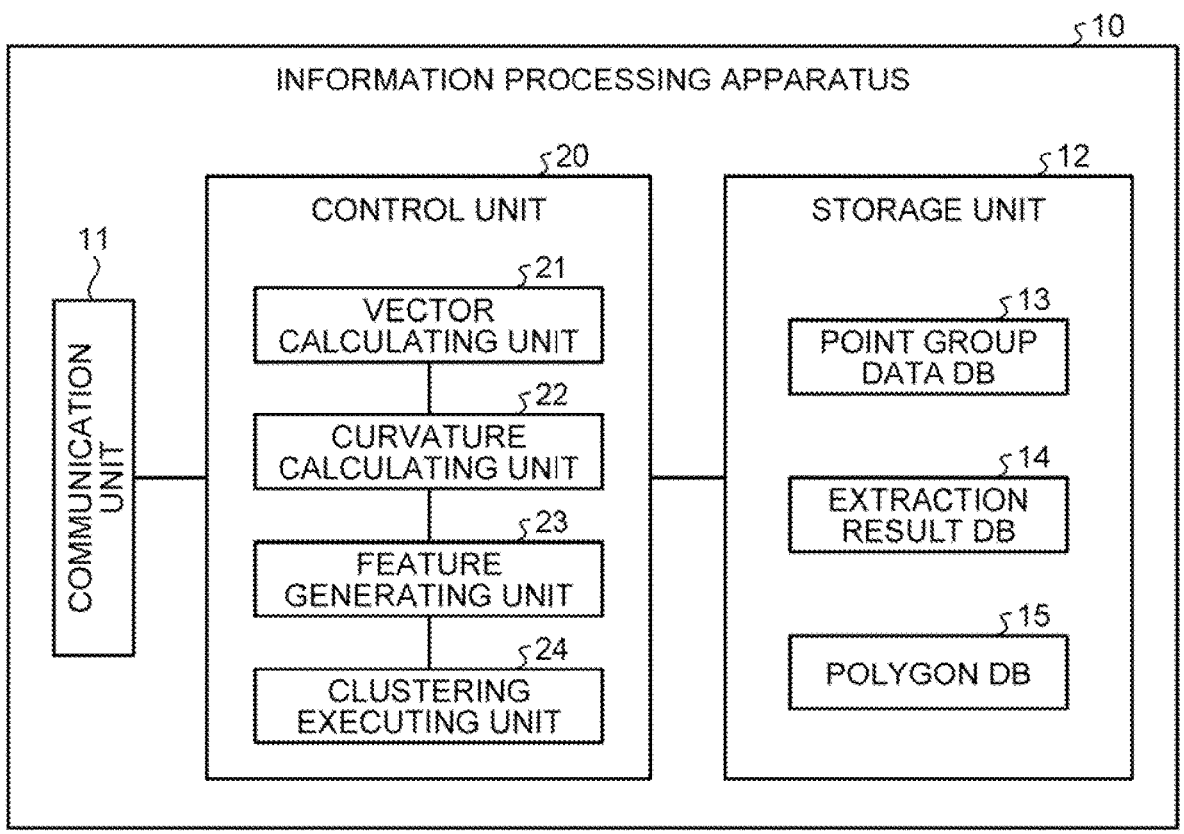
FIG. 7 is a functional block diagram illustrating a functional configuration of an information processing apparatus according to a second embodiment.

FIG. 7 is a functional block diagram illustrating a functional configuration of an information processing apparatus 10 according to the second embodiment. As illustrated in FIG. 7, similarly to the first embodiment, the information processing apparatus 10 has a communication unit 11, a storage unit 12, and a control unit 20. The information processing apparatus 10 according to the second embodiment is different from that of the first embodiment in that the information processing apparatus 10 according to the second embodiment additionally has a polygon DB 15 and a clustering executing unit 24.

The polygon DB 15 is a database storing therein plural polygons for fitting. For example, the polygon DB 15 stores therein plural polygons having different shapes and plural polygons having similar shapes.

The clustering executing unit 24 is a processing unit that executes, on the basis of curvatures of plural points of a set of point group data, clustering of plural points and outputs a result of the clustering executed. Specifically, the clustering executing unit 24 executes clustering according to geometric features of a set of point group data of an n-dimensional space. This clustering enables extraction of a set of singular points, such as corners, when a meshed shape is fitted to a point group (a set of point group data) that has been scanned in a three-dimensional space, for example.

For example, the clustering executing unit 24 receives input by an administrator and sets a scale parameter t and a threshold d. Subsequently, the clustering executing unit 24 calculates, for a set of point group data X that is a subset of an n-dimensional real number space $R^n$, a curvature c(x) of a set of point group data dependent on a threshold, for each point x (an element of the set of point group data X). Herein, the clustering executing unit 24 calculates the curvature c(x) by the method according to the first embodiment.

Subsequently, the clustering executing unit 24 determines that a(x)=−t when c(x)<−d, a(x)=0 when |c(x)|≤d, and a(x)=t when c(x)>d. The clustering executing unit 24 then increases the dimensionality of the set of point group data X by one dimension by using the curvature values to obtain a subset of an n+1-dimensional real number space $R^{n+1}$. Thereafter, the clustering executing unit 24 embeds each point of the set of point group data that has been increased in dimensionality by one dimension into the real number space $R^{n+1}$ by using Equation 4. That is, the clustering executing unit 24 maps each point of the set of point group data that has been increased in dimensionality by one dimension onto the real number space $R^{n+1}$ by topological mapping.

$$x \mapsto (x, a(x)) \quad (4)$$

Thereafter, the clustering executing unit 24 executes clustering of a mapped image by a shortest distance method, performs clustering of each point of the set of point group data and assigns a cluster generated to the point group of the time before the embedding. That is, the clustering executing unit 24 represents, in the original dimensionality, each point that has been increased in dimensionality by one dimension.

As described above, the clustering executing unit 24 increases the number of dimensions of each point of a set of point group data by one dimension by adding curvature, executes clustering in a state where the dimensionality has been increased by one dimension, and thereby enables accurate clustering of respective points of the set of point group data and distinction between similar sets of point group data.

Figure 8:
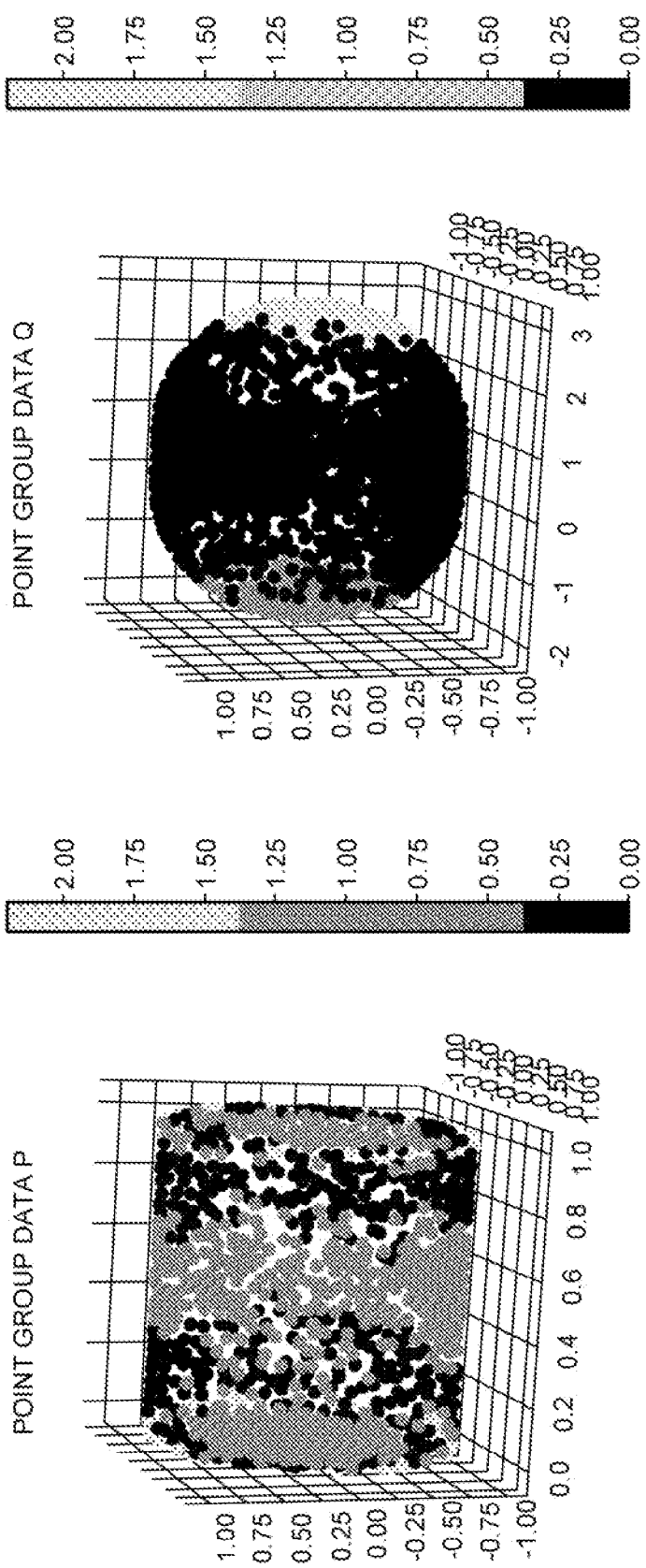
FIG. 8 is a diagram for explanation of results of clustering according to the second embodiment.

FIG. 8 is a diagram for explanation of results of clustering according to the second embodiment. The ability of the clustering executing unit 24 to cluster respective points of a set of point group data enables classification into, for example, a cluster A that is a cluster of points having curvatures less than a first threshold and having substantially no curvature, a cluster B that is a cluster of points having curvatures equal to or larger than the first threshold and less than a second threshold and having curvature a little, and a cluster C that is a cluster of points having curvatures equal to or larger than the second threshold and being large in curvature.

As a result, as can be understood by comparison between a result of clustering of the set of point group data P and a result of clustering of the set of point group data Q as illustrated in FIG. 8, the clustering executing unit 24 is able to determine that the set of point group data P and the set of point group data Q have entirely different shapes even though they are topologically similar in shape.

Therefore, the clustering executing unit 24 is able to select and fit a cylindrical polygon to the set of point group data P and a spherical polygon to the set of point group data Q. Accordingly, the clustering executing unit 24 is able to select appropriate polygons from the beginning and fit these polygons separately, enables reduction of mistakes in selection of polygons, and thus enables decrease in the processing time.

Flow of Process

Figure 9:
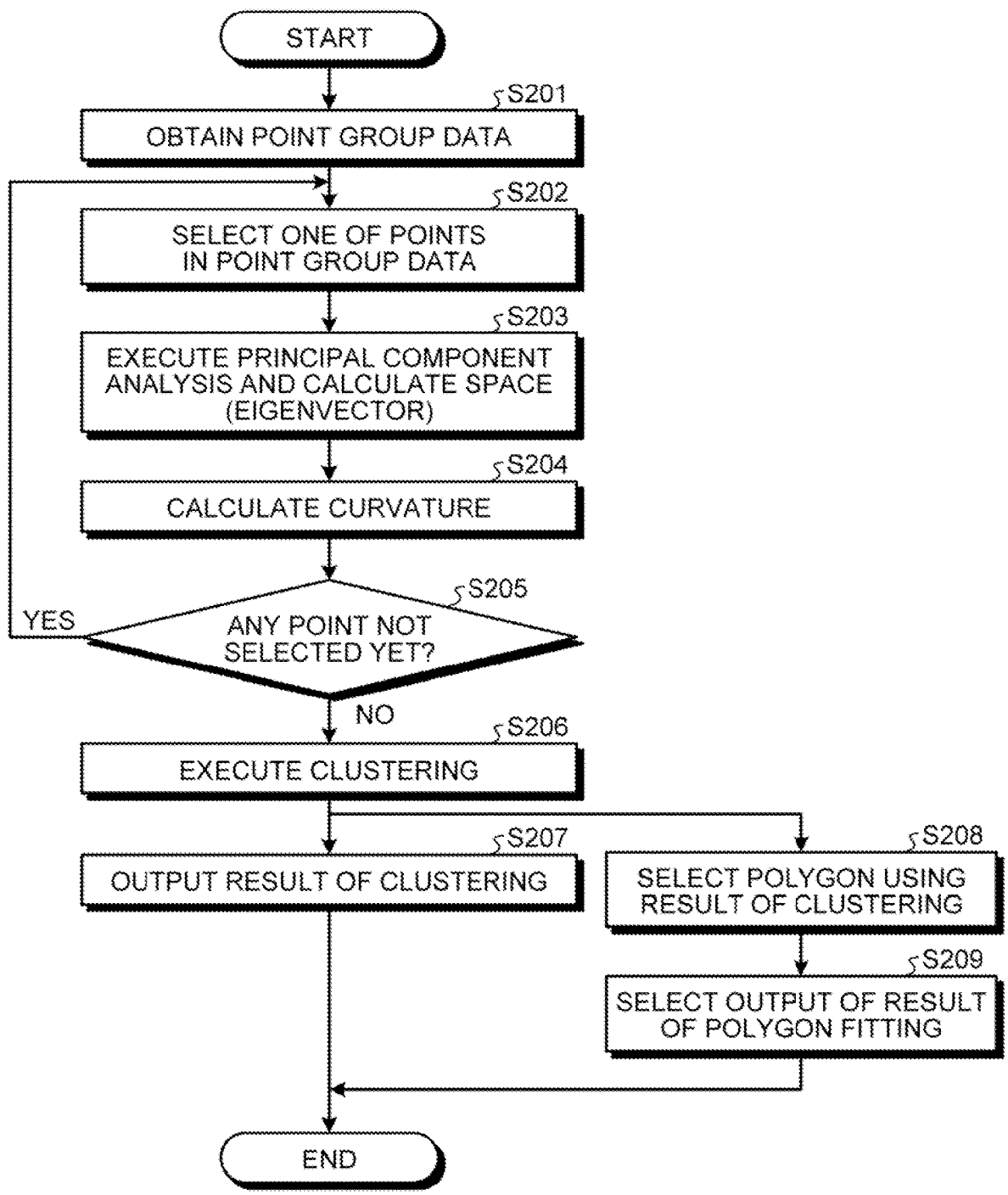
FIG. 9 is a flowchart illustrating a flow of a process according to the second embodiment.

FIG. 8 is a flowchart illustrating a flow of a process according to the second embodiment. As illustrated in FIG. 9, the vector calculating unit 21 of the information processing apparatus 10 obtains a set of point group data (S201) and selects one of points in the set of point group data (S202).

Subsequently, the vector calculating unit 21 calculates a space (an eigenvector) by executing principal component analysis (S203). The curvature calculating unit 22 then calculates a curvature that is a curvature value determined locally from the set of point group data (S204).

In a case where there is any point that has not been selected yet in the set of point group data (S205: Yes), the process is repeated from Step S202 for that point that has not been selected yet. On the contrary, in a case where there is no point that has not been selected yet in the set of point group data (S205: No), the clustering executing unit 24 executes, by using the curvatures calculated for respective points of the set of point group data, clustering of the respective points (S206).

Thereafter, the clustering executing unit 24 outputs a result of the clustering (S207). For example, the clustering executing unit 24 stores the result of the clustering into the storage unit 12 or transmits the result of the clustering to a destination indicated, such as an administrator.

In parallel therewith, the clustering executing unit 24 selects, by using the result of the clustering, an appropriate polygon from the polygon DB 15 (S208), performs fitting of the selected polygon to the set of point group data, and outputs a result of the fitting (S209). For example, the clustering executing unit 24 stores the result of the fitting into the storage unit 12 or transmits the result of the fitting to a destination indicated, such as an administrator.

Effects

As described above, the information processing apparatus 10 forms a set of point group data of a space having dimensionality that is one dimension higher by calculating curvatures determined locally from a set of point group data and adding values dependent on that information, the values serving as another component, and performs clustering of the formed set of point group data. That is, the information processing apparatus 10 is able to form feature values from a set of point group data provided and perform clustering by using both the feature values formed and coordinate components.

As a result, the information processing apparatus 10 is able to perform extraction of a set of singular points, such as corners, when fitting a meshed shape (a polygon) to a set of point group data that has been scanned in a three-dimensional space, for example. In this extraction, the information processing apparatus 10 is able to separately perform clustering of points having singular points. Accordingly, the information processing apparatus 10 is able to extract, in particular, a sharp portion or a portion having different dimensionality, and thus is able to execute clustering in consideration of geometric features of a set of point group data even if the overall shape of the set of point group data is unknown and is thus able to execute accurate fitting.

[c] Third Embodiment

Although embodiments of the present invention have been described thus far, the present invention may be implemented in various different modes, other than the above described embodiments.

Numerical Values, Etc.

Any numerical values, matrices, numbers of dimensions, and various variables used in the above described embodiments are just examples and may be freely modified. Furthermore, modification of the flows of the processes described by use of the flowcharts may be made as appropriate so long as no contradictions are caused by the modification. In addition, any of various clustering methods, such as the K-means method or the mean shift method, may be used as the clustering method.

System

The processing procedures, control procedures, specific names, and information including various data and parameters, which have been described above and illustrated in the drawings may be freely modified unless particular mention is made otherwise.

Furthermore, the illustrated respective components of the respective devices are of functional concept, and it is not always configured physically as illustrated. That is, specific modes of separation and integration of each apparatus are not limited to those illustrated in the drawings. Therefore, all or a part of each apparatus may be configured by functional or physical separation or integration in any units according to various loads and use situations.

Furthermore, all or any part of the processing functions performed in the apparatuses may be implemented by a CPU and a program analyzed and executed by the CPU, or may be implemented as hardware by wired logic.

Hardware

Figure 10:
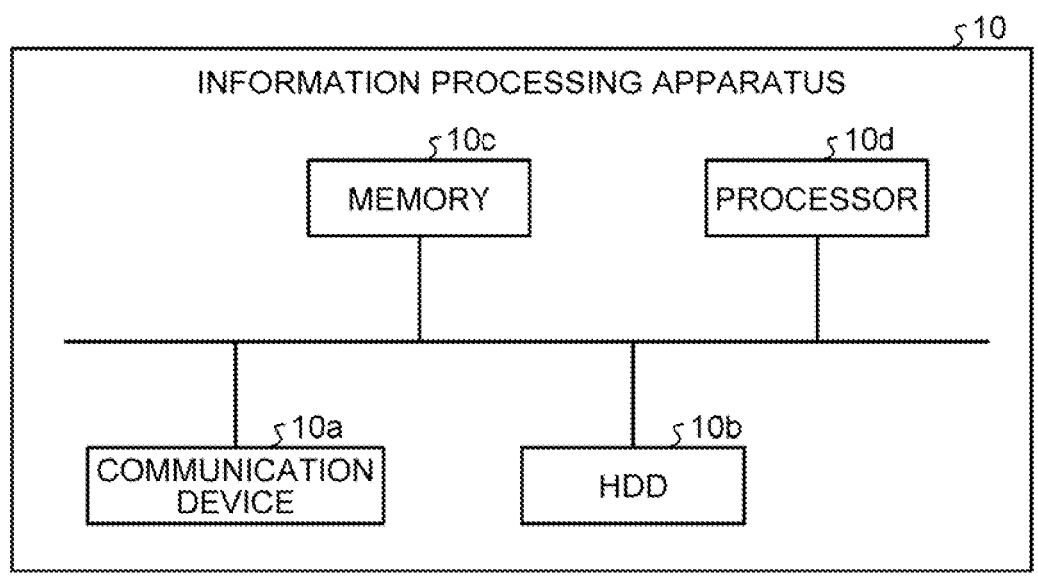
FIG. 10 is a diagram illustrating an example of a hardware configuration.

FIG. 10 is a diagram illustrating an example of a hardware configuration. As illustrated in FIG. 10, the information processing apparatus 10 has a communication device 10a, a hard disk drive (HDD) 10b, a memory 10c, and a processor 10d. Furthermore, these units illustrated in FIG. 10 are connected to one another via a bus.

The communication device 10a is a network interface card, for example, and performs communication with another device. The HDD 10b stores therein a DB and a program that causes the functions illustrated in FIG. 2 to operate.

The processor 10d causes a process to be operated, the process executing the functions described by reference to FIG. 2, for example, by reading, from the HDD 10b, the program that executes the same processing as the processing units illustrated in FIG. 2, and loading the program into the memory 10c. That is, this process executes the same functions as the processing units included in the information processing apparatus 10. Specifically, the processor 10d reads a program having the same functions as the vector calculating unit 21, the curvature calculating unit 22, and the feature generating unit 23, from the HDD 10b, for example. The processor 10d then executes a process that executes the same processing as the vector calculating unit 21, the curvature calculating unit 22, and the feature generating unit 23, for example.

As described above, the information processing apparatus 10 operates as an information processing apparatus that executes an extracting method, by reading and executing the program. Furthermore, the information processing apparatus 10 may implement the same functions as those according to any of the above described embodiments by reading the program from a recording medium by means of a medium reading device, and executing the program read. The program referred to herein is not limited to being executed by the information processing apparatus 10. For example, the present invention may be similarly applied to a case where another computer or server executes the program, or a case where that computer and that server execute the program in corporation with each other.

This program may be distributed via a network, such as the Internet. Furthermore, the program may be executed by being recorded in a computer-readable recording medium, such as a hard disk, a flexible disk (FD), a CD-ROM, a magneto-optical disk (MO), or a digital versatile disc (DVD), and being read from the recording medium by a computer.

In one aspect, features of respective points of a set of point group data are able to be extracted.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a data clustering program that causes a computer to execute a process comprising:

calculating, for each of plural points included in a set of point group data, an eigenvector by using principal component analysis for a set of point group data that is present within a predetermined distance from a point;

calculating a curvature value of a multidimensional function having an extreme point that is a point positioned nearest to the eigenvector calculated, the curvature value representing a state of curving;

executing clustering of the plural points of the set of point group data by using a frequency distribution of curvature values for each of the plural points of the set of point group data as a feature value; and outputting a result of execution of the clustering.

2. The non-transitory computer-readable recording medium according to claim 1, wherein the executing includes:

executing clustering of plural points resulting from increase in dimensionality of the plural points of the set of point group data by use of the curvature values for each of the plural points; and outputting a result of the clustering, the result serving as a result of the clustering of the plural points that are in a state before the increase in dimensionality.

3. The non-transitory computer-readable recording medium according to claim 1 or 2, wherein the executing includes:

selecting, on the basis of a result of the clustering, an appropriate polygon from plural polygons; and fitting the polygon selected to the set of point group data, and the outputting includes outputting a result of the fitting.

4. A data clustering method comprising:

calculating, for each of plural points included in a set of point group data, an eigenvector by using principal component analysis for a set of point group data that is present within a predetermined distance from a point, using a processor;

calculating a curvature value of a multidimensional function having an extreme point that is a point positioned nearest to the eigenvector calculated, the curvature value representing a state of curving, using the processor;

executing clustering of the plural points of the set of point group data by using a frequency distribution of curvature values for each of the plural points of the set of point group data as a feature value, using the processor; and outputting a result of execution of the clustering, using the processor.

5. An information processing apparatus comprising:

a processor configured to:

calculate, for each of plural points included in a set of point group data, an eigenvector by using principal component analysis for a set of point group data that is present within a predetermined distance from a point;

calculate a curvature value of a multidimensional function having an extreme point that is a point positioned nearest to the eigenvector calculated, the curvature value representing a state of curving;

execute clustering of the plural points of the set of point group data by using a frequency distribution of curvature values for each of the plural points of the set of point group data as a feature value; and output a result of execution of the clustering.

* * * * *